United States Patent
Glaser et al.

(10) Patent No.: US 8,077,386 B2
(45) Date of Patent: Dec. 13, 2011

(54) MOVABLE OBJECTIVE LENS ASSEMBLY FOR AN OPTICAL MICROSCOPE AND OPTICAL MICROSCOPES HAVING SUCH AN ASSEMBLY

(75) Inventors: Jacob R. Glaser, Williston, VT (US); Christoph Schmitz, Wuerselen (DE); Jeffrey H. Sprenger, Essex Junction, VT (US)

(73) Assignee: Microbrightfield, Inc., Williston, VT (US)

( * ) Notice: Subject to any disclaimer, the term of this patent is extended or adjusted under 35 U.S.C. 154(b) by 529 days.

(21) Appl. No.: 12/255,835

(22) Filed: Oct. 22, 2008

(65) Prior Publication Data

US 2010/0097692 A1   Apr. 22, 2010

(51) Int. Cl.
*G02B 21/00* (2006.01)
(52) U.S. Cl. ..................................... 359/381
(58) Field of Classification Search .............. 359/368, 359/363, 381, 370–378
See application file for complete search history.

(56) References Cited

U.S. PATENT DOCUMENTS

| | | |
|---|---|---|
| 4,017,147 A | 4/1977 | Weber et al. |
| 4,685,776 A | 8/1987 | Inoue et al. |
| 4,691,997 A | 9/1987 | Muchel |
| 4,744,642 A | 5/1988 | Yoshinaga et al. |
| 4,744,667 A | 5/1988 | Fay et al. |
| 4,818,084 A | 4/1989 | Wentz, III |
| 4,884,880 A | 12/1989 | Lichtman et al. |
| 5,099,363 A | 3/1992 | Lichtman |
| 5,198,927 A | 3/1993 | Rathbone et al. |
| 5,349,468 A | 9/1994 | Rathbone et al. |
| 5,818,637 A | 10/1998 | Hoover et al. |
| 5,825,533 A | 10/1998 | Yonezawa |
| 5,995,283 A | 11/1999 | Anderson et al. |
| 6,008,936 A | 12/1999 | Simon |
| 6,069,698 A | 5/2000 | Ozawa et al. |
| 6,075,643 A | 6/2000 | Nonoda et al. |
| 6,185,030 B1 | 2/2001 | Overbeck |
| 6,320,697 B2 | 11/2001 | Takeuchi |
| 6,347,009 B1 | 2/2002 | Takeuchi |

(Continued)

FOREIGN PATENT DOCUMENTS

EP   0718656   6/1996

OTHER PUBLICATIONS

International Search Report and Written Opinion dated Mar. 2, 2010 in related International Application No. PCT/US2009/060954.

(Continued)

*Primary Examiner* — Alessandro Amari
(74) *Attorney, Agent, or Firm* — Downs Rachlin Martin PLLC (57) ABSTRACT

A movable objective lens assembly that includes an infinity-corrected objective lens providing the microscope with an optical field of view. The assembly permits the imaging of a specimen under investigation over an area of the specimen much larger than the field of view of the objective lens without moving the microscope and/or a specimen stage relative to one another. The assembly includes a mirror system and the linearly movable infinity-corrected objective lens. The mirror system includes a plurality of mirrors that provide a folded optical path that allows the objective lens to be moved relative to the specimen without moving the entire microscope. The mirror system and the objective lens are pivotably mounted relative to the rest of the microscope so as to allow the objective lens to be located substantially anywhere within a circular, or circular-sectoral, viewing area.

52 Claims, 5 Drawing Sheets

U.S. PATENT DOCUMENTS

| | | |
|---|---|---|
| 6,411,838 B1 | 6/2002 | Nordstrom et al. |
| 6,483,641 B1 | 11/2002 | MacAulay |
| 6,663,560 B2 | 12/2003 | MacAulay et al. |
| 6,760,613 B2 | 7/2004 | Nordstrom et al. |
| RE38,847 E | 10/2005 | Nonoda et al. |
| 7,235,047 B2 | 6/2007 | MacAulay et al. |
| 2001/0008462 A1 | 7/2001 | Takeuchi |
| 2002/0018292 A1 | 2/2002 | Koetke |
| 2002/0154396 A1 | 10/2002 | Overbeck |
| 2003/0030896 A1* | 2/2003 | Brooker .................. 359/368 |
| 2004/0196457 A1 | 10/2004 | Aono et al. |
| 2005/0007660 A1 | 1/2005 | Denk |
| 2005/0231798 A1 | 10/2005 | Honda |
| 2006/0007534 A1* | 1/2006 | Fukuyama et al. ........... 359/368 |

OTHER PUBLICATIONS www.Ismtech.com; Objective Inverter, Copyrighted 2006.

* cited by examiner

MOVABLE OBJECTIVE LENS ASSEMBLY FOR AN OPTICAL MICROSCOPE AND OPTICAL MICROSCOPES HAVING SUCH AN ASSEMBLY

FIELD OF THE INVENTION

The present invention generally relates to the field of optical microscopy. In particular, the present invention is directed to a movable objective lens assembly for an optical microscope and optical microscopes having such an assembly.

BACKGROUND

Optical microscopes are important tools in a variety of analytical sciences, including, for example, neuroscience and related fields of study. Advanced neurobiology, for instance, uses optical microscopes to understand alterations in neural function due to changes in neuron structure and vice versa. This knowledge plays a crucial role in the development of novel therapeutic strategies that prevent or combat neurological and neuropsychiatric diseases such as, for example, Alzheimer's disease, schizophrenia, and stroke. To make advances in these areas, researchers rely on several techniques to understand the relationship between the neuron structure and its corresponding neural function. Electrophysiological (EP) recording, for instance, uses microelectrodes to stimulate the electrical activity of a nerve cell. The resultant recordings are often correlated to results of a neuronal reconstruction (NR) techniques, including an NR technique that automatedly generates a 3D structural model of a nerve cell (3D-ANR).

Typically, experiments directed to neuron structure combined with EP recording start with detecting the cell body of a neuron using infrared differential interference contrast (IR-DIC) video microscopy. Then, neurons may be identified with a dye (e.g., biocytin or Lucifer yellow) in 300 to 400 µm thick living brain slices during (or at the end of) EP recording by filling the cells with the dye. Afterwards the brain slices are usually fixed, cryo-protected, and sectioned on a cryostat into 50 µm to 60 µm thick sections to be analyzed separately for neuron morphology. It may be appreciated that a combined EP/3D-ANR technique would permit researchers to complete similar experiments without separate recording and analysis stages. However, although EP recording and 3D-ANR techniques typically use similar optical microscopes, each requires significantly different hardware configurations from the other that inhibit a comprehensive combined solution.

SUMMARY OF THE INVENTION

In one implementation, the present disclosure is directed to an optical microscope system. The optical microscope system includes a stage that includes a specimen region for holding a specimen; an infinity-corrected objective lens providing a field-of-view along a first optical axis perpendicular to the specimen region; an imaging body having an opening for receiving light from the infinity-corrected objective lens along a second optical axis parallel to the first optical axis of the infinity-corrected objective lens, the imaging body including an imaging lens fixed relative to the imaging body; and a mirror system that includes: a plurality of mirrors, including: a first mirror fixed along the second optical axis and pivotable thereabout, the first mirror for directing light from a third optical axis perpendicular to the second optical axis to along the second optical axis; and a second mirror fixed relative to the infinity-corrected objective lens and movable in a direction parallel to the third optical axis, the second mirror for directing light from the field of view along a fourth optical axis parallel to the third optical axis; and a support supporting the plurality of mirrors so as to allow the plurality of mirrors to pivot about the second optical axis.

In another implementation, the present disclosure is directed to an optical microscope system. The optical microscope system includes a stage that includes a specimen region for holding a specimen; an infinity-corrected objective lens providing a field-of-view along a first optical axis perpendicular to the specimen region; an imaging body having an opening for receiving light from the infinity-corrected objective lens along a second optical axis parallel to the first optical axis of the infinity-corrected objective lens; and a mirror system that includes: a plurality of mirrors, including: a first mirror fixed along the second optical axis and pivotable thereabout, the first mirror for directing light from a third optical axis perpendicular to the second optical axis to along the second optical axis; and a second mirror fixed relative to the infinity-corrected objective lens and movable in a direction parallel to the third optical axis, the second mirror for directing light from the field of view along a fourth optical axis parallel to the third optical axis; and a support supporting the plurality of mirrors so as to allow the plurality of mirrors to pivot about the second optical axis; wherein the mirror system is configured so that the first optical axis of the infinity-corrected objective lens is positionable so as to be coaxial with the second optical axis of the imaging body by translation of the first mirror relative to the second mirror.

In still another implementation, the present disclosure is directed to an optical microscope setup. The optical microscope setup includes a stage for supporting a specimen, having a first side and a second side spaced from the first side, so that each of the first and second sides is viewable; a first optical microscope comprising: a first imaging body having a first primary optical axis; and a first movable objective lens assembly having a first objective lens located for viewing the first side of the specimen when the specimen is supported by the stage, the first objective lens having a first optical axis and a first field of view, and the first movable objective lens assembly configured to move the first objective lens in a direction perpendicular to the first optical axis; and a second optical microscope comprising: a second imaging body having a second primary optical axis; and a second movable objective lens assembly having a second objective lens located for viewing the second side of the specimen when the specimen is supported by the stage, the second objective lens having a second optical axis and a second field of view, and the second movable objective lens assembly configured to move the second objective lens in a direction perpendicular to the second optical axis.

In yet another implementation, the present disclosure is directed to a method of performing microscopy on a specimen using an optical microscope setup that includes a first objective lens having a first magnification power and first field of view and a second objective lens having a second magnification power greater than the first magnification power and a second field of view, wherein the specimen has a first side and a second side spaced from the first side and the first objective lens is located on the first side of the specimen and the second objective lens is located on the second side of the specimen. The method includes determining a location of a feature of interest based on a first position of the first objective lens; and based on the determining of the location of the feature of interest, automatedly moving the second objective lens to a second position so that the second field of view contains at least a portion of the feature of interest.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

It is contemplated that a single system configured to permit Electrophysiological (EP) recording and 3D structural modeling of a nerve cell (3D-ANR) simultaneously would provide several advantages. A combined EP/3D-ANR system, for example, would permit repetitive monitoring of potential alterations in the morphology of different neurons (filled with different fluorescent dyes) during or as a result of electric stimulation. Experiments conducted with a combined EP/3D-ANR system would also permit the results of neuron reconstruction to be used to guide the placement of EP probes. This advantage is particularly important when examining connected neurons because IR-DIC does not permit a nerve fiber (e.g., an axon) to be clearly visualized. Without a clear picture of the entire neuron structure, any analysis using EP recordings of connected neurons has a relatively low success rate because the placement of microelectrodes on adjacent neurons is done relatively blindly. On the other hand, executing a 3D-ANR simultaneously with an EP experiment may provide a neuron model that enables accurate placement of microelectrodes in experiments, e.g., involving a single distal synaptic connection formed between different areas (e.g., between the dentate gyrus and the CA3 in the hippocampus.)

Most optical microscopes and corresponding microscopy techniques are incompatible with a combined EP/3D-ANR system for studying neuron structure. More particularly, traditional systems do not meet the accuracy requirements for successful implementation of a combined EP/3D-ANR system because they require either (1) moving simultaneously the microelectrodes for EP recording and the tissue chamber that carries the specimen or (2) moving the entire microscope relative to the specimen. A movable objective lens assembly made in accordance with concepts of the present invention, on the other hand, provides high-accuracy movements (e.g., increments of less than about 0.25 μm), which are not possible using existing optical microscope technology, such as, for example, an optical microscope having an encoded, closed loop motorized specimen stage.

At a very high level, an optical microscope magnifies an image using visible light from a light source that illuminates the underside of a specimen. An optical microscope includes an optical pathway that permits visible light captured by an objective lens (also known as an "objective" or "object lens") to travel to an imaging lens (or group of lenses), which brings a magnified image into focus on a light detecting apparatus, for example, a human eye, a camera, a sensor, and any combination thereof. Both the imaging lens and objective lens include a series of refractive lenses that work in conjunction with one another to generate a magnified image having a predetermined magnification level.

The magnification level defines a corresponding field-of-view that describes the diameter of a circle of visible light. Because the field-of-view becomes smaller as the level of magnification increases, it follows that the visible portion of a specimen will also be reduced. Accordingly, to view other portions of the specimen without reducing the magnification level (and thereby increasing the field-of-view), some microscopes are equipped with a mechanical stage that moves the specimen relative to the field-of-view. Other microscopes that include a stationary stage require that the specimen be repositioned on the stage in order to place a different portion of the specimen in the field-of-view. Still other microscopes include a specimen that is fixedly mounted in a manner that requires the microscope to be re-positioned to move the field-of-view. None of these options maintains the necessary magnification for certain procedures, such as EP/3D-ANR, while providing an accurate positioning mechanism for moving a specimen within a field-of-view. A movable objective lens assembly made in accordance with novel concepts of the present disclosure, however, can simultaneously satisfy both of these requirements.

Figure 1A:
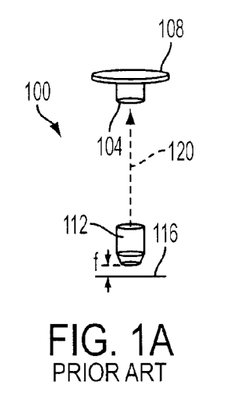
FIG. 1A is a high-level elevational diagram illustrating a conventional microscope system that includes an infinity-corrected objective lens and has an optical path set at a first length.
Figure 1B:
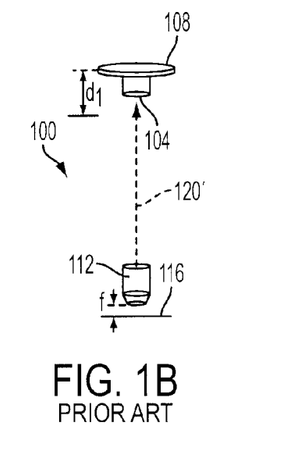
FIG. 1B is a high-level elevational diagram of the conventional microscope system of FIG. 1A in which the optical path is set to a second length greater than the first length of FIG. 1A.

Referring now to the drawings, by way of background FIGS. 1A-B illustrate basic components of a typical conventional optical imaging-type microscope 100. Microscope 100 includes an imaging lens 104 and an image sensor 108, the combination of which captures a magnified image. Alternatively, and as those skilled in the art know, image sensor 108 may be replaced with, or accompanied by, a suitable eyepiece (not shown) that allows a user to view the image directly. Conventional microscope 100 also includes an objective lens 112 positioned at a focal distance from a tissue specimen 116. FIG. 1A shows microscope 100 as having an optical path 120 formed between the backside of objective lens 112 and imaging lens 104. Comparatively, FIG. 1B shows microscope 100 as having an optical path 120' that is longer than optical path 120 of FIG. 1A by a distance $d_1$. Although optical path 120' of FIG. 1B is longer than optical path 120 of FIG. 1A, by using an infinity-corrected objective lens for objective lens 112, in the scenario of FIG. 1B sensor 108 will capture a magnified image of tissue specimen 116 that is substantially similar in quality to the magnified image of the tissue specimen captured by the sensor in the scenario of FIG. 1A, except for a minimal loss of intensity due to refraction caused by air within the optical path and sub-microscopic particles, which can be neglected for purposes of the examples provided herein. FIGS. 1A-B illustrate the concept that when using infinity-corrected optics, here infinity-corrected objective lens 112, the image formed at image sensor 108 essentially does not vary as a function of the length of the optical path, here, each of optical paths 120, 120'.

Figure 2:
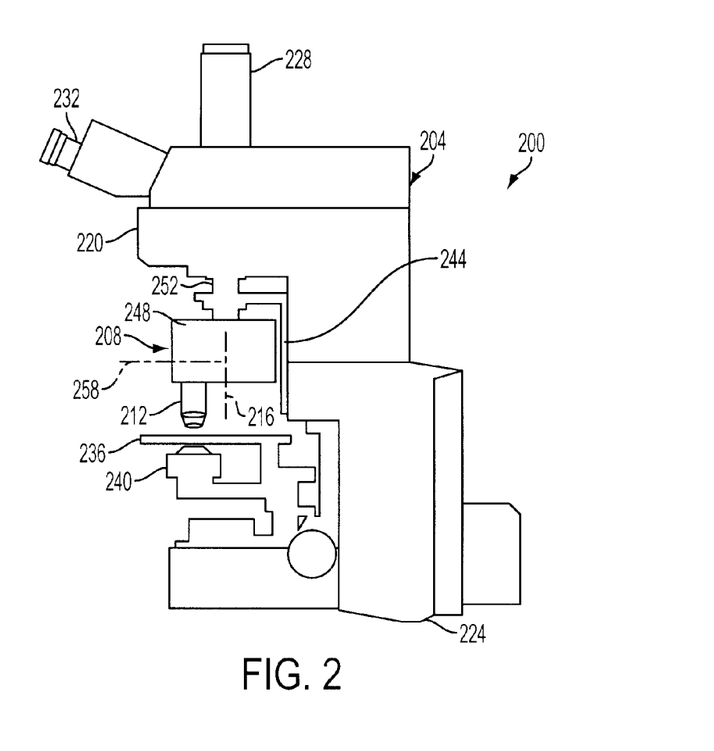
FIG. 2 is a side elevational view of a conventional microscope retrofitted with a movable objective lens assembly made in accordance with broad concepts of the present disclosure.

In contrast to conventional microscope 100 of FIGS. 1A-B, FIG. 2 illustrates a microscope system 200 (in this example an upright optical bright-field-type microscope system) made in accordance with some of the broad concepts of the present disclosure. In this example, microscope system 200 includes an optical bright-field microscope 204 (such as microscope 100 of FIG. 1, but without conventional objective 112) outfitted with a movable objective lens assembly 208, which has an objective lens 212 that is movable laterally relative to the primary optical axis 216 of microscope 204. This lateral movement is effected by lateral translation of objective lens 212 toward and away from primary optical axis 216 or a combination of this lateral translation with revolution of the objective lens about the primary optical axis. Before describing movable objective lens assembly 208 in more detail, for the sake of context and completeness, components of microscope 204 are first described.

Microscope 204 includes an imaging body 220 and base 224 that, as those skilled in the art will recognize, provides primary optical axis 216 and contain various optic, mechanical, electrical and electromechanical systems for enabling various functionality and operations of the microscope, including functionality and operation well known in the art, such as focusing, specimen illumination and image acquisition, among others. In this example, microscope system 200 has an imaging device 228 (e.g., video camera) mounted to body 220 of microscope 204 so that its image sensor (not shown) is located orthogonally to primary optical axis 216. Microscope system 200 also includes an imaging eyepiece 232 for viewing of essentially the same image available to imaging device 228. As those skilled in the art will readily understand, microscope 204 includes an internal beamsplitter (not shown) for providing the split optical paths to imaging device 228 and eyepiece 232. Microscope 204 also includes a stage 236 for supporting a specimen (not shown), such as a specimen mounted to a conventional microscope slide. One or more illuminators, in this example a single bright-field condenser 240, is mounted to base 224. Depending on the extent of movability of objective lens 212 and the nature of the illuminator(s), the illuminator(s) may be fixed relative to base 224 or, alternatively, may be movable relative to base in concert with the objective lens so that the light emitted from the illuminator(s) remains in proper alignment with the objective lens.

As those skilled in the art will appreciate, although the present example is directed to a bright field optical microscope, in other embodiments the illuminator(s) provided may be for another type of optical microscopy, such as oblique illumination microscopy, dark field microscopy, dispersion staining microscopy, phase contrast microscopy, differential interference contrast microscopy and fluorescence microscopy. In addition, microscope 204 may have another configuration, such as an inverted configuration, and it need not be a conventional microscope that is retrofitted with a movable objective lens assembly such as assembly 208, but rather it may include a designed-in movable objective lens that provides the same functionality as assembly 208.

As will be seen relative to FIGS. 3A-6B, movable objective lens assembly 208 allows a user to move objective lens 212 essentially to any location within a circular "scan area" centered on primary optical axis 216. A benefit of the movability of objective lens 212 includes the ability to move the field-of-view of the objective lens without having to move stage 236. This permits microscope 204 to be used for efficient scanning of relatively larger areas of a specimen, for example, for creating high-power images of a specimen, or portion thereof, that are significantly large than the field-of-view of objective lens 212.

In this example, movable objective lens assembly 208 is fixedly secured to microscope 204 (here, base 224) by a suitable support 244. Although support 244 is shown as being attached to base 224, in other embodiments it may be attached to imaging body 220. Assembly 208 includes a mirror housing 248, which contains a plurality of mirrors (not shown in FIG. 2, but described in detail below and shown throughout the remaining figures), and an optical tube 252 extending between imaging body 220 of microscope 204 and the mirror housing. Mirror housing 248 and optical tube 252 provide a substantially sealed optical path from objective lens 212 to imaging body 220 that inhibits dust and other contaminants from reaching the insides of the mirror housing and the optical tube. As mentioned above, objective lens 212 is translationally movable relative to primary optical axis 216 using two degrees of freedom, namely, translation parallel to a radial line 258 radiating normally from primary optical axis 216 and revolution about the primary optical axis. The movability of objective lens 212 is described below in detail.

Figure 3A:
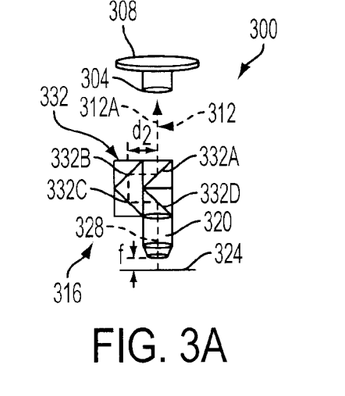
FIG. 3A is a high-level elevational diagram illustrating a microscope system that includes a movable objective lens assembly having an infinity-corrected objective lens, showing the objective lens coaxial with the primary optical axis of the microscope.
Figure 3B:
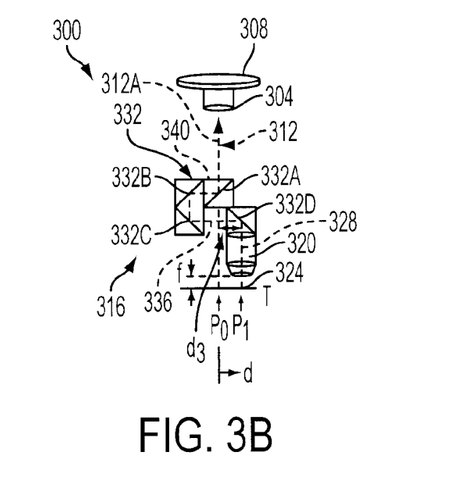
FIG. 3B is a high-level elevational diagram of the microscope system of FIG. 3A showing the objective lens offset from the primary optical axis of the microscope.

FIGS. 3A-B illustrate basic components of an optical microscope system 300 made in accordance with novel concepts of the present disclosure, such as microscope system 200 of FIG. 2. Like microscope 100 of FIGS. 1A-B in this example microscope 300 of FIGS. 3A-B includes an imaging lens 304 and an image sensor 308 positioned along an optical path 312. However, unlike microscope 100 of FIGS. 1A-B, microscope 300 of FIGS. 3A-B further comprises a movable objective lens assembly 316 that includes an infinity-corrected objective lens 320, which, like objective lens 112 of FIGS. 1A-B may be located a focal distance f from a specimen 324. As will be described in more detail in connection with FIGS. 4A-B, 5A-B and 6A-B below, objective lens 320 is mounted in a manner that permits it to move over a desired scan area 400 (FIGS. 4B, 5B and 6B) that is larger than the field-of-view provided by the objective lens itself.

Referring to FIGS. 4A-B, 5A-B and 6A-B, and also to FIGS. 3A-B, the size of scan area 400 may correspond to, or otherwise encompass, the extent of specimen 324 (FIGS. 3A-B) or a smaller portion thereof, depending on the size of the specimen and the range of movement provided to objective lens 320 by movable objective lens assembly 316. Such movement permits objective lens 320 to be positioned so as to place its corresponding field-of-view over differing portions of specimen 324 without changing the magnification of microscope 300 (e.g., by switching the objective lens with a higher power objective lens) and without moving the tissue specimen and/or the entire microscope relative to one another. As those skilled in the art will readily appreciate, scan area 400 (FIG. 4B) enabled by movable objective lens assembly 316 will be circular in shape when the assembly is mounted so that it is rotatable a full 360° about a portion 312A of optical path 312 between objective lens assembly 316 and imaging lens 304. (Portion 312A of optical path 312 in this example would be coincident with primary optical axis 216 of imaging body 220 of FIG. 2.) With such a configuration, those skilled in the art will appreciate that the position of objective lens 320 anywhere within scan area 400 may be identified using polar coordinates (here, (d, θ)), wherein d is the horizontal centerline offset distance shown in FIG. 3B between the optical axis 328 of the objective lens and portion 312A of optical path 312, and θ (FIG. 4B) is the angular rotation of movable objective lens assembly 316 about that same portion of optical path 312 relative to an established radial baseline (not shown, but could be any suitable baseline that may, for example, be dependent on whatever mechanism is used to provide the movable objective lens assembly with its rotatability).

In this example embodiment, movable objective lens assembly 316 also includes a mirror assembly 332 positioned generally above objective lens 320 and including four mirrors 332A-D. As discussed in more detail below, mirrors 332A-C are stationary relative to the mirror assembly and mirror 332D is movable relative to the mirror assembly in conjunction with objective lens 320. Although movable objective lens assembly 316 may be fixedly attached directly to microscope 300, it is contemplated that other designs would permit mirror assembly 332 to be executed in any manner that establishes its location with respect to portion 312A of optical path 312 without being attached directly to the microscope. In the present example, mirror 332A may be considered to be located co-axially with portion 312A of optical path 312 and mirrors 332B-C are located in an offset relationship to portion 312A defined by a distance $d_2$. Mirror 332D, on the other hand, is mounted in a manner that permits it to move with respect to portion 312A of optical path 312 in tandem with objective lens 320 in directions toward and away from mirror 332C.

As will be understood from FIGS. 3A-B, 4A-B, 5A-B and 6A-B, mirror assembly 332 is configured to allow objective lens 320 to be moved radially (relative to portion 312A of optical path 312) while maintaining the proper optical path 312 between movable objective lens assembly 316 and imaging lens 304 (FIGS. 3A-B) that allows the desired image to form at image sensor 308. Four-mirror mirror assembly 332 accomplishes this by folding optical path 312 in a manner that provides a leg 336 (FIG. 3B) that is perpendicular to portion 312A of optical path 312 and has a length that varies as objective lens 320 is moved radially. As seen by comparing FIGS. 3A and 3B, when objective lens 320 is moved by a distance $d_3$ (FIG. 3B) away from portion 312A of optical path 312, the total length of the optical path increases by distance $d_3$. Because objective lens 320 is infinity-corrected, this increase in length of optical path 312 does not significantly impact the quality and character of the image available at image sensor 308. In an alternative embodiment having four mirrors arranged similarly to mirrors 332A-D, the other horizontal leg 340 (FIG. 3B) could be the one with variable length. In that embodiment, mirror 332A of FIGS. 3A-B, 4A-B, 5A-B and 6A-B could be made fixed relative to portion 312A of optical path 312 and mirrors 332B-D fixed together and to objective lens 320 so as to move in concert with the objective lens relative to that portion of the optical path.

In view of the foregoing, it will be appreciated that, other things being equal, mirror assembly 332 as illustrated in FIG. 3A has optical path 312 that is longer than optical path 120 described in connection with FIG. 1A by a distance of $2d_2$. In contrast, as seen in FIG. 3B moving objective lens 320 and mirror 332D from a first position $P_0$ to second position $P_1$ further elongates optical path 336 by a distance $d_3$. Accordingly, while image sensor 308 and imaging lens 304 have not moved in a manner similar to FIGS. 1A-B, optical path 336 is increased in length by $2d_2+d_3$ without changing the magnification or focus of the microscopic image of specimen 324 because of the infinity-corrected nature of objective lens 320. In a combined EP/3D-ANR system, in one example of an instantiation of microscope 300 of FIGS. 3A-B, 4A-B, 5A-B and 6A-B containing movable objective lens assembly 316 in accordance with the present disclosure, mirror assembly 332 may include a total axial travel distance of less than about 1 cm, based on an incremental accuracy discussed above that is less than about 0.25 μm.

FIGS. 4A-B, 5A-B and 6A-B illustrate movable objective lens assembly 316 of microscope 300 of FIGS. 3A-B in more detail and so as to illustrate the movability of objective lens 320 not only in a linear manner, but also in a radial manner. As mentioned above, this movability allows objective lens 320 to be located as needed to allow its field of view to be placed anywhere within scanning area 400. As shown in each of FIGS. 4A-B, 5A-B and 6A-B, movable objective lens assembly 316 includes a mirror-assembly support 404 that supports objective lens 320 and mirror assembly 332 so as to permit the objective lens and mirror assembly to pivot around a rotational axis 408 that is co-axial with portion 312A of optical path 312. In the present example, mirror-assembly support 404 is circular in shape. In one example, mirror assembly 332 may be rotationally fixed relative to mirror assembly support 404, and the support may include a rack or other feature (not shown) that a pinion, gear or other driving means may engage so as to pivot the support and mirror assembly in concert with one another. In another example, a circular embodiment of mirror-assembly support 404 may act as a fixed support rail on which mirror assembly 332 slides, rolls or otherwise moves along the rail when pivoted, for example, by a drive actuator/mechanism (not shown) located near portion 312A of optical path 312. Although mirror-assembly support 404 is shown as circular in this embodiment, it is contemplated that other embodiments of the support 404 may have a different shape, such as, for example, square, rectangular, oval, etc., with the ultimate design being dependent on a number of factors, including design choice, space constraints and type of drive system, among others. In yet other embodiments, mirror-assembly support 404 may be integrated into a housing. For example, such a housing may be generally circular in shape, fixed relative to microscope 300 with which movable objective lens assembly 316 is attached, and enclose a region in which mirror assembly 332 pivots during use. In still yet other embodiments, mirror-assembly support 404 need not be used, as mirror assembly 332 may be supported in a manner similar to the manner shown in FIG. 2, such as by optical tube 252, which is fixed to microscope 204. In such a case, the rotational drive actuator/mechanism could also be supported by optical tube 252 or support 244.

Referring again to FIGS. 3A-B, 4A-B, 5A-B and 6A-B, in this example movable objective lens assembly 316 is configured to permit 360° rotation of objective lens 320 and mirror assembly 332 about rotational axis 408, which again is coaxial with portion 312A of optical path 312 of microscope 300 (FIGS. 3A-B). This rotation, in conjunction with a second degree-of-freedom of axial translation of objective lens 320 and mirror 332D along a translation axis 412, allows the objective lens to be positioned so as to place its corresponding field-of-view onto virtually any portion of scan area 400. Using, for example, a polar coordinate (d, θ) control scheme, the position of objective lens 320 and mirror 332D can essentially be defined for every location within scan area 400. Importantly, a movable objective lens assembly made in accordance with concepts of the present disclosure and having this field-of-view-enlarging capability can readily permit the scanning of a relatively large area of a tissue or other specimen, or an entire specimen, without having to move a microscope stage and/or a microscope relative to one another. The increase in observable specimen area can improve the execution of certain procedures, such as the procedures discussed above.

Figure 4A:
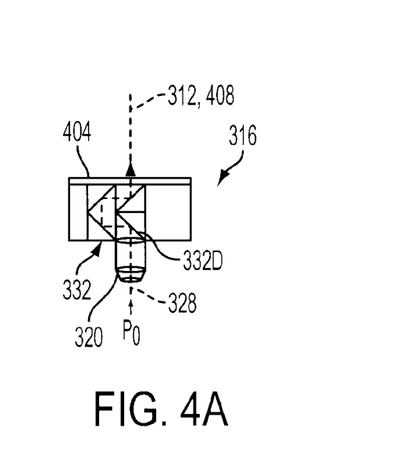
FIG. 4A is a high-level elevational diagram of the movable objective lens assembly of FIGS. 3A-B showing the objective lens coaxial with the central optical axis of the microscope.
Figure 4B:
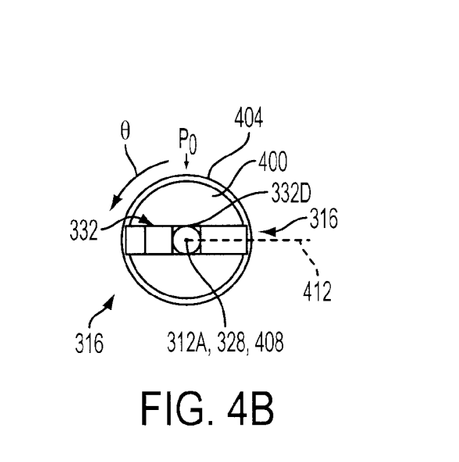
FIG. 4B is a high-level plan diagram of the movable objective lens assembly in the state illustrated in FIG. 4A.
Figure 5A:
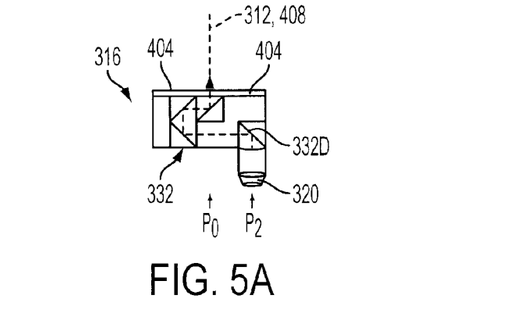
FIG. 5A is a high-level elevational diagram of the movable objective lens assembly of FIGS. 3A-B and 4A-B showing the objective lens offset relative to the central optical axis of the microscope.
Figure 5B:
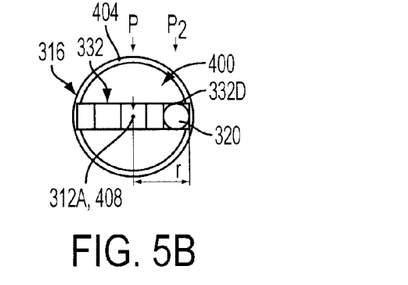
FIG. 5B is a high-level plan diagram of the movable objective lens assembly in the state illustrated in FIG. 5A.
Figure 6A:
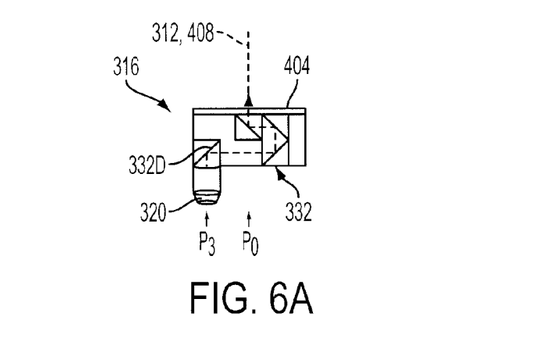
FIG. 6A is a high-level elevational diagram of the movable objective lens assembly of FIGS. 3A-B, 4A-B and 5A-B showing the objective lens offset relative to the central optical axis of the microscope and the mirror assembly rotated about the central optical axis.
Figure 6B:
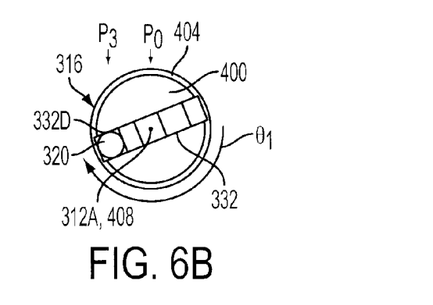
FIG. 6B is a high-level plan diagram of the movable objective lens assembly in the state illustrated in FIG. 6A.

In this connection, positions $P_0$, $P_2$, $P_3$ of, respectively, FIGS. 4A-B ($P_0$), 5A-B ($P_2$) and 6A-B ($P_3$) illustrate three differing positions into which mirror 332D and objective lens 320 are moveably positioned in relation to scan area 400. As explained above in the context of FIGS. 3A-B, when objective lens 320 is an infinity-corrected optic, although the optical path varies in length as between the differing positions of FIGS. 4A-B, 5A-B and 6A-B (here, positions $P_0$, $P_2$, $P_3$, respectively), the quality and character of the magnified images received by image sensor 308 will not be substantially compromised. Comparing FIGS. 4B and 5B with one another, it can be readily appreciated that position $P_2$ of FIG. 5B can be achieved from position $P_0$ of FIG. 4B simply by translation of objective lens 320 and mirror 332D along translation axis 412 of mirror assembly 332. Comparing FIGS. 5B and 6B with one another, it can be appreciated that position $P_3$ can be achieved from position $P_2$ by rotating mirror assembly 332, for example, by the angle $\theta_1$ shown. Consequently, position $P_3$ of FIG. 6B can be achieved from position $P_0$ of FIG. 4B by performing, for example, an axial translation of objective lens 320 and mirror 332D from first position $P_0$ to second position $P_2$ of FIG. 5B and a rotation to third position $P_3$.

Figure 7A:
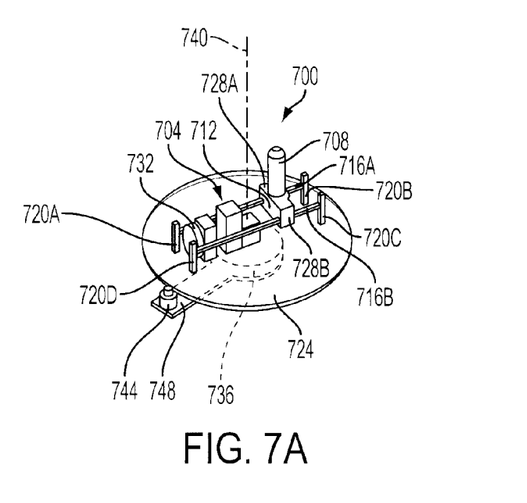
FIG. 7A is an inverted isometric view of a movable objective lens assembly without a mirror housing illustrating example drive mechanisms for translating the objective and rotating the mirror assembly.
Figure 7B:
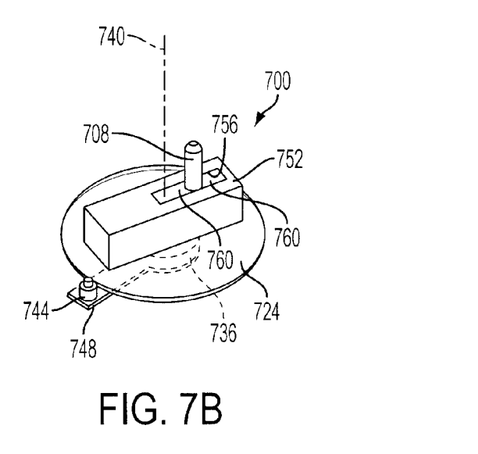
FIG. 7B is an inverted isometric view of a the movable objective lens assembly of FIG. 7A showing the mirror housing installed.

FIGS. 7A-B show a movable objective lens assembly 700 having a four-mirror mirror assembly 704 and infinity-corrected objective lens 708 that are substantially the same as, respectively, mirror assembly 332 and objective lens 320 of FIGS. 3A-B. FIGS. 7A-B illustrate an example actuation scheme for moving objective lens 708 (and corresponding mirror 712) of mirror assembly 704) linearly and moving the entire mirror assembly rotationally so as to effect the two degrees of freedoms discussed above relative to FIGS. 2, 3A-B, 4A-B, 5A-B and 6A-B. In this example, mirror 712 and objective lens 708 are supported by two externally threaded screws 716A-B, which are rotatably mounted to a set of screw supports 720A-D fixed to a circular disk 724. Screws 716A-B are oppositely threaded and threadingly engage corresponding respective ones of a pair of mirror supports 728A-B. A motor or other rotational actuator 732 engages both screws 716A-B so that when the actuator rotates, the screws turn in opposing directions relative to one another. As screws 716A-B are turned, mirror 712 and objective lens 708 move linearly parallel to the screws so as to provide the pure linear degree of freedom to the objective lens. With suitably pitched thread on screws 716A-B and/or suitable gearing of rotational actuator 732, the movement of objective lens 708 can be very finely controlled as needed to suit a particular application.

Disk 724 is rotatably mounted to a disk support 736 that allows the disk to rotate about its concentric center 740. When mounted to a microscope, such as microscope 204 of FIG. 2, disk support 736 may be fixedly secured to the microscope in any suitable manner so that its concentric center 740 coincides with the primary optical axis of the microscope, such as primary optical axis 216 in FIG. 2. For example, in the context of microscope 204 of FIG. 2, disk support 736 may be secured to optical tube 252, support 244, or both. Referring again to FIGS. 7A-B, as shown disk 724 is rotated by a motor or other rotational actuator 744, which may be supported by an actuator support 748 fixedly secured to disk support 736. Depending on the gearing of rotational actuator 744 and the diameter of disk 724, the rotational degree of freedom of movable objective lens assembly 700 may be as finely controlled as needed. Rotational position can be sensed using any suitable transducer (not shown), such as position sensor/encoder. The sensed position can be used, for example, in a feedback control system (not shown) for controlling the pivoting mirror assembly 704 during operation. FIG. 7B shows assembly 700 as including a mirror housing 752 having an elongated opening 756 for accommodating the translational movement of objective lens 708. To provide a dust seal that inhibits dust from entering the interior of housing 752, opening 756, on either side of objective lens 708, is filled by a suitable closure 760, such as a roll-up-type closure.

Figure 8:
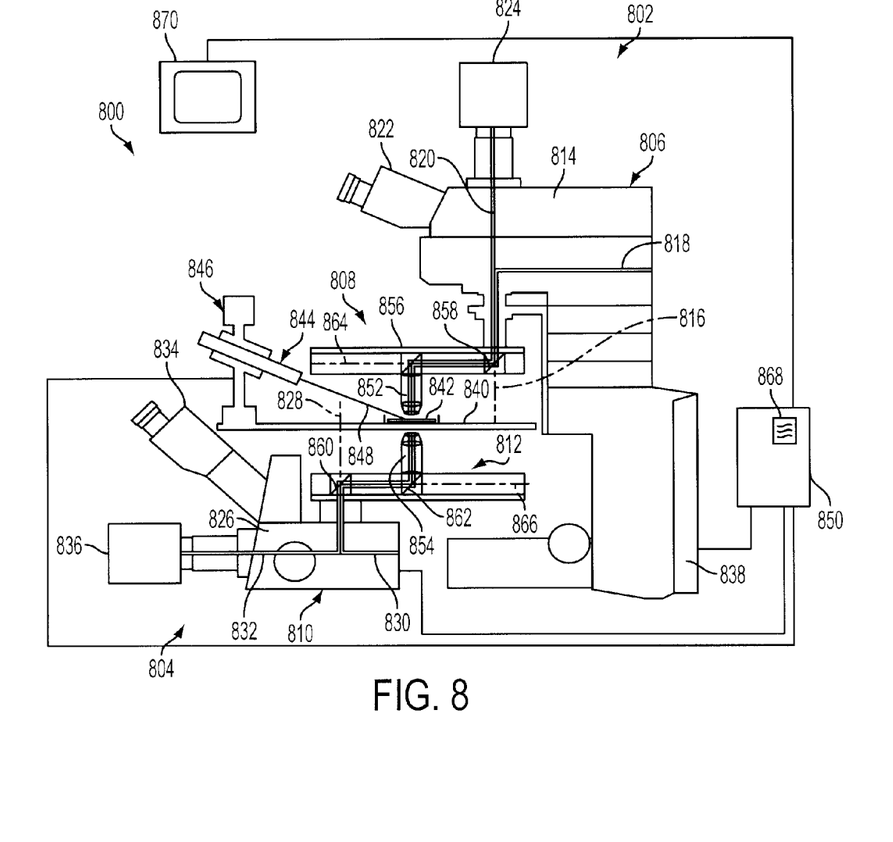
FIG. 8 is a side elevational view of dual-objective microscope setup having first and second movable objective lens assemblies.

FIG. 8 illustrates another microscope setup 800 that incorporates various broad concepts of the present disclosure. Microscope setup 800 includes an upright microscope system 802 and an inverted microscope system 804, both of which are fluorescence-type microscopes in this example. It is noted, however, that in other embodiments each of upright and inverted microscope system 802, 804 may be of another type, such as one of the other types noted above relative to microscope system 200 of FIG. 2. It is further noted that in other embodiments, upright and inverted microscopes need not be of the same type, depending on the desired application of microscope setup 800.

Upright microscope system 802 includes an upright microscope 806 and a first movable objective lens assembly 808. Similarly, inverted microscope system 804 includes an inverted microscope 810 and a second movable objective lens assembly 812. In this example, upright microscope 806 includes a first imaging body 814 that provides a first primary optical axis 816 and contains optics for 1) directing a first fluorescent light beam 818 toward first movable objective lens assembly 808, 2) splitting light 820 reflected along the primary optical path from the first movable objective assembly to each of a first eyepiece 822 and a first imaging device 824 and 3) forming an image from the light reflected along the primary optical path. In this connection, first imaging body 814 includes at least one imaging lens (or group of lenses) (not shown, but can be similar to imaging lens 304 of FIGS. 3A-B) fixed relative to the imaging body. Inverted microscope 810 includes a second imaging body 826 that provides a second primary optical axis 828 and contains optics for 1) directing a second fluorescent light beam 830 toward second movable objective lens assembly 812, 2) splitting light 832 reflected along the primary optical path from the second movable objective assembly to each of a second eyepiece 834 and a second imaging device 836 and 3) forming an image from the light reflected along the primary optical path. In this connection, second imaging body 826 includes at least one imaging lens (or group of lenses) (not shown, but can be similar to imaging lens 304 of FIGS. 3A-B) fixed relative to the imaging body. Upright microscope 806 also includes a base 838 that supports and raises first imaging body 814 relative to inverted microscope system 804.

Microscope setup 800 also includes a stage 840 that supports a specimen 842, for example, a tissue specimen, and further includes a micromanipulator 844, which can be used for a number of purposes, such as injecting a dye (e.g., a fluorescence dye) into the specimen. Micromanipulator 844 may be movably mounted to stage 840 via a suitable support 846. In one example, support 846 may be movably engaged with stage 840 so as to be movable around the stage (either manually or automatically or a combination of both). Support 846 may also, or alternatively, be configured to provide the manipulated item, here a probe 848, with one or more degrees of movement, either manually or automatically or a combination of both. In this connection, microscope setup 800 may include a controller 850 (here represented as a central controller but could also be a distributed system or a combination thereof) for controlling various functionality and/or operations of the various components of microscope setup, including controlling automatic movement of support 846 and/or the manipulated item in response to controlling input from a user. Controller 850 may be implemented in a number of ways as will be understood by those skilled in the art. For example, controller 850 may be implemented using a computer, such as a general purpose personal computer, among others. Such controlling input may be input via any suitable user interface, that may include any one or more of a graphical user interface, touchscreen, soft controls, hard controls (such as a joystick, mouse, tablet/puck, etc.) and voice activated controls, among others. Controller 850 may also be used to control functionality and/or operation of first and second movable objective lens assemblies 808, 812 so as to move corresponding respective first and second objective lenses 852, 854, for example, as described below.

In this example, each of first and second movable objective lens assembles 808,812 are of a two-mirror type in which two mirrors 856, 858 (first assembly 808), 860, 862 (second assembly) enable the translatability of a corresponding objective lens 852, 854 along the corresponding respective translation axes 864, 866 of the first and second movable objective lens assemblies. In this example, each of first and second movable mirror assemblies is arranged so that it can be moved (at least at its theoretical limits), in this example, substantially anywhere within first and second circular sectors 900, 904 (FIG. 9), lying in corresponding respective planes perpendicular to, respectively, first and second primary optical axes 816, 828. These circular sectors 900, 904 are located so that they overlap a substantial amount and, in this example, so that they overlap at a common scan area 908 wherein, as described below, specimen 842, or portion thereof, is placed during use of dual-microscope setup 800.

In one example use of dual-microscope setup 800, first and second objective lenses 852, 854 are of differing magnifying powers. In this example, one of first and second objective lenses 852, 854, say second objective lens 854, being used as a low-power "scouting" lens and the other, here, first objective lens 852, being used as a high-power "detail" lens. During an example usage session, second objective lens 854 is used to scan specimen 842, or a portion thereof, at a relatively low power while a user (not shown) and/or image recognition software 868, for example, is seeking, or looking for, one or more items of interest, such as one or more physical features. In the example of a human user, the user may view the current field of view of the second objective lens either by looking through second eyepiece 834 or observing the field of view on a video display 870 as captured by second imaging device 836. The user may control the movement of second objective lens 854 via controller 850 using any suitable type of user interface. Under full automation, controller 850 may move second objective lens 854, for example, according to a predetermined scouting path.

Following identification of a feature (location) of interest (again, either by a human user or recognition software 868, or both), in this example higher-power first objective lens 852 is moved so that its field of view encompasses all or part of the feature (location) of interest. In this manner, the higher-power first objective lens 852 can be used for higher-power imaging of the feature (location) of interest. In a manner similar to lower-power second objective lens 854, a user may use first eyepiece 822 on first microscope 806 to view the feature (location) of interest at the higher power of first objective lens 852. Alternatively, or in addition, the user may view an image of the field of view of first objective lens 852 on display 870 or another display. Of course, images (still or moving) of the fields of view of one, the other, or both, of first and second objective lenses 852, 854 as captured by imaging devices 824, 836 may be stored in any suitable manner, such as on an optical disk, magnetic disk or any other suitable type of storage device (not shown).

Figure 9:
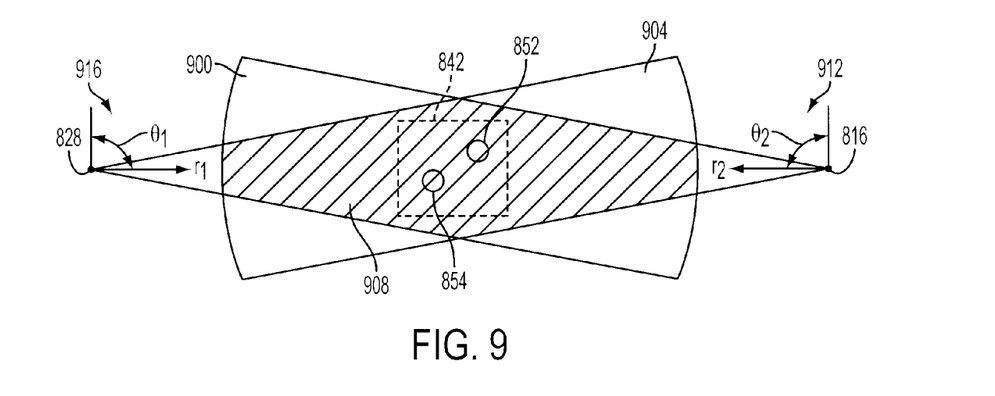
FIG. 9 is a plan view of a common scan area of the first and second movable objective lens assemblies of FIG. 8.

In this example, higher-power first objective lens 852 may be moved to a feature (location) of interest in a completely automated manner. For example and referring to FIG. 9, first and second coordinate systems 912, 916 may be established, respectively, to describe the locations of first and second objective lenses 852, 854 within their corresponding respective sectors 900, 904 of movement. Because of the rotational nature of each of first and second movable objective assemblies 808, 812, each of first and second coordinate systems 912, 916 may be the polar coordinate systems shown. Each of these "local" coordinate systems 912, 916 can be used directly by controller 850 (FIG. 8) in controlling the linear and rotational movements of the respective first or second movable objective assembly 808, 812, for example, via corresponding drive mechanisms (not shown, but see the examples in FIG. 10). Referring to FIGS. 8 and 9, with 1) a first known local coordinate system for accurately determining the position of second movable objective lens 854 (here coordinate system 916) relative to second primary optical axis, 2) a known location and orientation of second primary optical axis 828 relative to first primary optical axis 816, 3) as needed, the location of the feature (location) of interest within the field of view of the second objective lens and 4) a second known local coordinate system for accurately positioning first objective lens 852 relative to the first primary optical axis (here coordinate system 912), controller 850 can readily be able to determine the coordinates of the feature (location) of interest in the first coordinate system.

Controller 850 can then be used to move first objective lens 852 so that its field of view encompasses the feature (location) of interest. Those skilled in the art will appreciate that there may be other ways of moving first objective lens 852 to the necessary position to view the feature (location) of interest initially found using second objective lens 854, for example, by using a global coordinate system that is global to both first and second microscope systems 802, 804. It is noted that locating of higher-power first objective lens 852 as a function of the location of the feature (location) of interest as determined via lower-power second objective lens 852 may be enhanced by an auto-focus feature. An example auto-focus feature may use depth of focus information from lower-power second objective lens 854 in combination with one or more reference points, axes, etc. (such as a perpendicular distance between the horizontal plane containing horizontal optical axis 866 of second movable lens assembly 812 and the upper surface of a slide supporting specimen 842) fixed relative to both of first and second microscope system 802, 804. As those skilled in the art will appreciate, with such information, and also depth-of-focus information for higher-power first objective lens 852, controller 850 can determine the proper depth of focus of the first objective lens from the depth of focus of lower-power second objective lens 854. The algorithms needed to perform calculations and to control one or more auto-focus actuators for implementing such auto-focusing features are within the ordinary skill of an artisan in the relevant technical field.

In other embodiments of a dual-microscope setup similar to dual-microscope setup 800 of FIG. 8 the functions of the two microscopes may be reversed, with the upright microscope providing the lower-power objective lens and the inverted microscope providing the higher-power objective lens. In yet other embodiments, the magnification of both objective lenses of the first and second movable objective lens assemblies may be of the same power. In such embodiments, these objectives may be used to independently, or coordinatedly, view the differing sides of the specimen.

Figure 10:
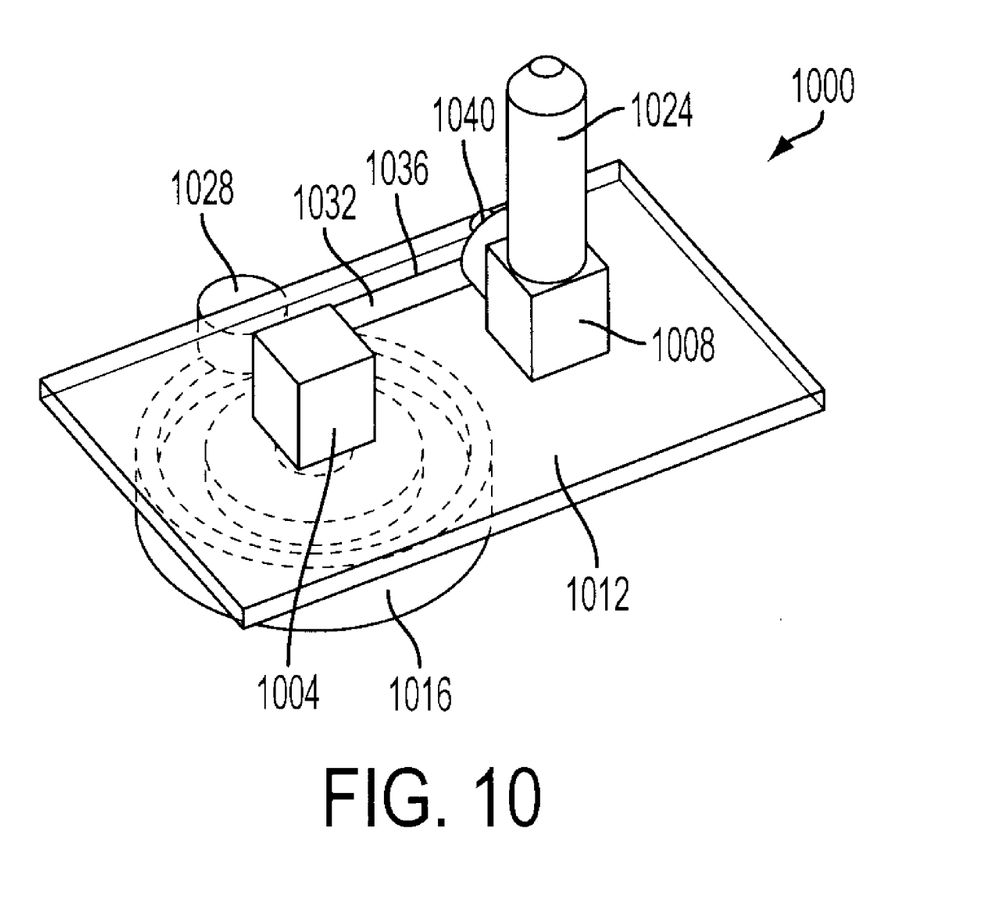
FIG. 10 is an inverted isometric view of a movable objective lens assembly without a mirror housing illustrating a two-mirror movable objective lens assembly that can be used, for example, as either one or both of the first and second movable lens assemblies of FIG. 8.

As discussed above, each of first and second movable objective lens assemblies 808, 812 in this example is a two-mirror type assembly that uses two mirrors. FIG. 10 illustrates a two-mirror movable objective lens assembly 1000 that could be used for either one or both of first and second movable objective lens assemblies 808, 812. In this example, two-mirror assembly 1000 includes a fixed mirror 1004 and a movable mirror 1008 that is movable in translation relative to the fixed mirror. Fixed mirror 1004 is fixedly secured to a pivotable base 1012 that is pivotable relative to a fixed base 1016 about a pivot axis 1020 that passes through the fixed mirror 1004. When fixed base 1016 of two-mirror assembly 1000 is fixedly secured to a microscope, such as either first microscope 806 or second microscope 810 of FIG. 8, pivot axis 1020 would be positioned to coincide with the primary optical axis of that microscope. In the context of first microscope 806 of FIG. 8, that primary optical axis is axis 816. Similarly, in context of second microscope 810 of FIG. 8, that primary optical axis is axis 828.

Two-mirror assembly 1000 also includes an infinity-corrected objective lens 1024 fixed relative to movable mirror 1008. Objective lens 1024 may be of any magnification power needed to suit a particular purpose. Of course, in the example of FIG. 8, two instantiations of two-mirror assembly 1000 (FIG. 10) for use as first and second movable objective lens assemblies of FIG. 8 would have differing magnification powers. Pivotable base 1012 may be pivoted relative to fixed base 1016 using a first actuator 1028, for example a stepper motor. In other embodiments, another type of actuator may be used, such as a linear actuator. In addition, the actuator provided may either be manually actuated or powered. If first actuator 1028 is of a powered type, it can further be controlled by a suitable controller. In the example of FIG. 8, controller 850 could control the operation of first actuator 1028 according to any suitable control algorithm.

In this example, movable mirror 1008 is linearly movable relative to pivotable base 1012 via a rail 1032 fixed to the pivotable base and a second actuator 1036 fixed to the movable mirror. Second actuator 1036 may be a powered actuator, for example, a stepper motor, and may be controlled by a controller, such as controller 850 of FIG. 8, in conjunction with first actuator 1028 to properly position objective lens 1024 at a desired position relative to a specimen, for example, specimen 842 of FIG. 8. Second actuator 1036 may include a pinion 1040 that engages a corresponding rack (not shown) on rail 1032. In alternative embodiments, second actuator 1036 may be a manually operated actuator, such as a micrometer-type screw system. Another type of actuator, such as a linear actuator, for example, a piezoelectric linear motor, can be used to impart the linear movement of movable mirror 1008 relative to pivotable base. It is noted that two-mirror movable objective lens assembly 1000 is shown with its protective structures, for example, housing and closure(s), removed. However, it should be understood that movable objective lens assembly 1000 could include a housing and closure(s) similar to housing 752 and closure 760 of FIG. 7B.

Referring again to FIGS. 2 and 8, it is seen that these figures illustrate not only two different types of movable objective lens assemblies (assembly 208 being a four-mirror assembly and both of assemblies 808, 812 being two-mirror assemblies), but also two different implementations of these assemblies. In FIG. 2, movable objective lens assembly 208 is used to move corresponding objective lens 212 over a circular scan area (see, e.g., scan area 400 of FIG. 4B) having its geometric center along primary optical axis 216. However, in FIGS. 8 and 9, each of first and second movable lens assemblies 808, 812 are used to move corresponding respective objective lenses 852, 854 generally within circular sectors 900, 904 having their arc centers along the corresponding respective primary optical axes 816, 828. While these implementations are shown, it is noted that all combinations and permutations of the differing types of movable objective lens assemblies and differing implementations are possible. For example, four-mirror assembly 208 can be used in a setup that scans only in a circular sector, and each of two-mirror assemblies 808, 812 can be used in setups that scan circular scan areas. Regarding the latter, however, it is noted that, unlike a four-mirror assembly and due to the physical limitations of a two-mirror assembly, the objective lens of a two mirror assembly cannot be located so that its optical axis coincides with the primary optical axis of the microscope it is attached to. In addition, it is noted that regardless of the type of the movable objective lens assembly or its implementation, the optics of the various setups do not require use of any image rotators. Furthermore, while specific examples of drive systems are shown for each of the four- and two-mirror assemblies shown in FIGS. 7A and 10, it is noted that the drive systems of these two assemblies are interchangeable with one another and with other drive systems that may occur to those skilled in the art.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:
1. An optical microscope system, comprising:
a stage that includes a specimen region for holding a specimen;
an infinity-corrected objective lens providing a field-of-view along a first optical axis perpendicular to said specimen region;
an imaging body having an opening for receiving light from said infinity-corrected objective lens along a second optical axis parallel to said first optical axis of said infinity-corrected objective lens, said imaging body including an imaging lens fixed relative to said imaging body; and a mirror system that includes:
- a plurality of mirrors, including:
  - a first mirror fixed along said second optical axis and pivotable thereabout, said first mirror for directing light from a third optical axis perpendicular to said second optical axis to along said second optical axis; and
  - a second mirror fixed relative to said infinity-corrected objective lens and movable in a direction parallel to said third optical axis, said second mirror for directing light from said field of view along a fourth optical axis parallel to said third optical axis; and
- a support supporting said plurality of mirrors so as to allow said plurality of mirrors to pivot about said second optical axis;
- wherein said mirror system is configured so that said first optical axis of said infinity-corrected objective lens is positionable so as to be coaxial with said second optical axis of said imaging body by translation of said first mirror relative to said second mirror.

2. An optical microscope system according to claim 1, wherein said mirror system consists essentially of four mirrors such that said mirror system includes a third mirror and a fourth mirror working cooperatively with one another so as to fold said fourth optical path along said third optical path.

3. An optical microscope system according to claim 2, wherein said third and fourth mirrors are fixed relative to said first mirror and said second mirror is movable along said fourth optical path.

4. An optical microscope system according to claim 1, wherein said third and fourth optical axes are coaxial with one another.

5. An optical microscope system according to claim 1, wherein said specimen region has a geometric center and said second optical axis of said imaging base intersects said specimen region substantially at said geometric center.

6. An optical microscope system according to claim 5, wherein said infinity-corrected objective lens is pivotable 360° about said second optical axis.

7. An optical microscope system according to claim 1, wherein said support includes a circular member having an outer periphery and located concentrically with said second optical axis, the optical microscope system further comprising a first actuator in operative engagement with said circular member proximate said outer periphery so as to cause said mirror system to pivot about said second optical axis when said first actuator is actuated.

8. An optical microscope system according to claim 7, wherein said second mirror has a maximum travel distance away from said second optical axis and said circular member has an outside diameter greater than twice the maximum travel distance of said second mirror.

9. An optical microscope system according to claim 7, further comprising a second actuator fixed relative to said circular member, said second actuator for moving said second mirror toward and away from said second optical axis.

10. An optical microscope system according to claim 7, wherein said support is pivotably attached to said imaging body and said first actuator is fixedly supported by said imaging body.

11. An optical microscope system according to claim 1, further comprising a movable condenser movable in concert with said infinity-corrected objective lens so as to maintain proper alignment between said infinity-corrected objective lens and said movable condenser when said infinity-corrected objective lens is moved among differing positions.

12. An optical microscope system according to claim 1, wherein the optical microscope system is configured so that said infinity-corrected objective lens is movable only in a circular sector having a central angle less than 180°.

13. An optical microscope system according to claim 1, wherein said imaging body is a conventional imaging body, and said infinity-corrected objective lens, said mirror system and said support form a movable objective lens assembly, said movable objective lens assembly being retrofitted to said conventional imaging body.

14. An optical microscope system, comprising:
- a stage that includes a specimen region for holding a specimen;
- an infinity-corrected objective lens providing a field-of-view along a first optical axis perpendicular to said specimen region;
- an imaging body having an opening for receiving light from said infinity-corrected objective lens along a second optical axis parallel to said first optical axis of said infinity-corrected objective lens; and
- a mirror system that includes:
  - a plurality of mirrors, including:
    - a first mirror fixed along said second optical axis and pivotable thereabout, said first mirror for directing light from a third optical axis perpendicular to said second optical axis to along said second optical axis; and
    - a second mirror fixed relative to said infinity-corrected objective lens and movable in a direction parallel to said third optical axis, said second mirror for directing light from said field of view along a fourth optical axis parallel to said third optical axis; and
  - a support supporting said plurality of mirrors so as to allow said plurality of mirrors to pivot about said second optical axis;
  - wherein said mirror system is configured so that said first optical axis of said infinity-corrected objective lens is positionable so as to be coaxial with said second optical axis of said imaging body by translation of said first mirror relative to said second mirror.

15. An optical microscope system according to claim 14, wherein said mirror system consists essentially of four mirrors such that said mirror system includes a third mirror and a fourth mirror working cooperatively with one another so as to fold said fourth optical path along said third optical path.

16. An optical microscope system according to claim 15, wherein said third and fourth mirrors are fixed relative to said first mirror and said second mirror is movable along said fourth optical path.

17. An optical microscope system according to claim 14, wherein said specimen region has a geometric center and said second optical axis of said imaging base intersects said specimen region substantially at said geometric center.

18. An optical microscope system according to claim 17, wherein said infinity-corrected objective lens is pivotable 360° about said second optical axis.

19. An optical microscope system according to claim 14, wherein said support includes a circular member having an outer periphery and located concentrically with said second optical axis, the optical microscope system further comprising a first actuator in operative engagement with said circular member proximate said outer periphery so as to cause said mirror system to pivot about said second optical axis when said first actuator is actuated.

20. An optical microscope system according to claim 19, wherein said second mirror has a maximum travel distance away from said second optical axis and said circular member has an outside diameter greater than twice the maximum travel distance of said second mirror.

21. An optical microscope system according to claim 19, further comprising a second actuator fixed relative to said circular member, said second actuator for moving said second mirror toward and away from said second optical axis.

22. An optical microscope system according to claim 19, wherein said support is pivotably attached to said imaging body and said first actuator is fixedly supported by said imaging body.

23. An optical microscope system according to claim 14, further comprising a movable condenser movable in concert with said infinity-corrected objective lens so as to maintain proper alignment between said infinity-corrected objective lens and said movable condenser when said infinity-corrected objective lens is moved among differing positions.

24. An optical microscope system according to claim 14, wherein the optical microscope system is configured so that said infinity-corrected objective lens is movable only in a circular sector having a central angle less than 180°.

25. An optical microscope system according to claim 14, wherein said imaging body is a conventional imaging body, and said infinity-corrected objective lens, said mirror system and said support form a movable objective lens assembly, said movable objective lens assembly being retrofitted to said conventional imaging body.

26. An optical microscope system according to claim 14, wherein said third and fourth optical axes are coaxial with one another.

27. An optical microscope system, comprising:
a stage that includes a specimen region for holding a specimen;
an infinity-corrected objective lens providing a field-of-view along a first optical axis perpendicular to said specimen region;
an imaging body having an opening for receiving light from said infinity-corrected objective lens along a second optical axis parallel to said first optical axis of said infinity-corrected objective lens, said imaging body including an imaging lens fixed relative to said imaging body; and
a mirror system that includes:
a plurality of mirrors, including:
a first mirror fixed along said second optical axis and pivotable thereabout, said first mirror for directing light from a third optical axis perpendicular to said second optical axis to along said second optical axis; and
a second mirror fixed relative to said infinity-corrected objective lens and movable in a direction parallel to said third optical axis, said second mirror for directing light from said field of view along a fourth optical axis parallel to said third optical axis; and
a support supporting said plurality of mirrors so as to allow said plurality of mirrors to pivot about said second optical axis;
wherein said mirror system consists essentially of four mirrors such that said mirror system includes a third mirror and a fourth mirror working cooperatively with one another so as to fold said fourth optical path along said third optical path.

28. An optical microscope system according to claim 27, wherein said mirror system is configured so that said first optical axis of said infinity-corrected objective lens is positionable so as to be coaxial with said second optical axis of said imaging body by translation of said first mirror relative to said second mirror.

29. An optical microscope system according to claim 27, wherein said third and fourth mirrors are fixed relative to said first mirror and said second mirror is movable along said fourth optical path.

30. An optical microscope system according to claim 27, wherein said third and fourth optical axes are coaxial with one another.

31. An optical microscope system according to claim 27, wherein said specimen region has a geometric center and said second optical axis of said imaging base intersects said specimen region substantially at said geometric center.

32. An optical microscope system according to claim 31, wherein said infinity-corrected objective lens is pivotable 360° about said second optical axis.

33. An optical microscope system according to claim 27, wherein said support includes a circular member having an outer periphery and located concentrically with said second optical axis, the optical microscope system further comprising a first actuator in operative engagement with said circular member proximate said outer periphery so as to cause said mirror system to pivot about said second optical axis when said first actuator is actuated.

34. An optical microscope system according to claim 33, wherein said second mirror has a maximum travel distance away from said second optical axis and said circular member has an outside diameter greater than twice the maximum travel distance of said second mirror.

35. An optical microscope system according to claim 33, further comprising a second actuator fixed relative to said circular member, said second actuator for moving said second mirror toward and away from said second optical axis.

36. An optical microscope system according to claim 33, wherein said support is pivotably attached to said imaging body and said first actuator is fixedly supported by said imaging body.

37. An optical microscope system according to claim 27, further comprising a movable condenser movable in concert with said infinity-corrected objective lens so as to maintain proper alignment between said infinity-corrected objective lens and said movable condenser when said infinity-corrected objective lens is moved among differing positions.

38. An optical microscope system according to claim 27, wherein the optical microscope system is configured so that said infinity-corrected objective lens is movable only in a circular sector having a central angle less than 180°.

39. An optical microscope system according to claim 27, wherein said imaging body is a conventional imaging body, and said infinity-corrected objective lens, said mirror system and said support form a movable objective lens assembly, said movable objective lens assembly being retrofitted to said conventional imaging body.

40. An optical microscope system, comprising:
a stage that includes a specimen region for holding a specimen;
an infinity-corrected objective lens providing a field-of-view along a first optical axis perpendicular to said specimen region;

an imaging body having an opening for receiving light from said infinity-corrected objective lens along a second optical axis parallel to said first optical axis of said infinity-corrected objective lens, said imaging body including an imaging lens fixed relative to said imaging body; and a mirror system that includes:
   a plurality of mirrors, including:
      a first mirror fixed along said second optical axis and pivotable thereabout, said first mirror for directing light from a third optical axis perpendicular to said second optical axis to along said second optical axis; and
      a second mirror fixed relative to said infinity-corrected objective lens and movable in a direction parallel to said third optical axis, said second mirror for directing light from said field of view along a fourth optical axis parallel to said third optical axis; and
   a support supporting said plurality of mirrors so as to allow said plurality of mirrors to pivot about said second optical axis;
wherein said specimen region has a geometric center and said second optical axis of said imaging base intersects said specimen region substantially at said geometric center.

41. An optical microscope system according to claim 40, wherein said mirror system is configured so that said first optical axis of said infinity-corrected objective lens is positionable so as to be coaxial with said second optical axis of said imaging body by translation of said first mirror relative to said second mirror.

42. An optical microscope system according to claim 40, wherein said mirror system consists essentially of four mirrors such that said mirror system includes a third mirror and a fourth mirror working cooperatively with one another so as to fold said fourth optical path along said third optical path.

43. An optical microscope system according to claim 42, wherein said third and fourth mirrors are fixed relative to said first mirror and said second mirror is movable along said fourth optical path.

44. An optical microscope system according to claim 40, wherein said third and fourth optical axes are coaxial with one another.

45. An optical microscope system according to claim 40, wherein said infinity-corrected objective lens is pivotable 360° about said second optical axis.

46. An optical microscope system according to claim 40, wherein said support includes a circular member having an outer periphery and located concentrically with said second optical axis, the optical microscope system further comprising a first actuator in operative engagement with said circular member proximate said outer periphery so as to cause said mirror system to pivot about said second optical axis when said first actuator is actuated.

47. An optical microscope system according to claim 46, wherein said second mirror has a maximum travel distance away from said second optical axis and said circular member has an outside diameter greater than twice the maximum travel distance of said second mirror.

48. An optical microscope system according to claim 46, further comprising a second actuator fixed relative to said circular member, said second actuator for moving said second mirror toward and away from said second optical axis.

49. An optical microscope system according to claim 46, wherein said support is pivotably attached to said imaging body and said first actuator is fixedly supported by said imaging body.

50. An optical microscope system according to claim 40, further comprising a movable condenser movable in concert with said infinity-corrected objective lens so as to maintain proper alignment between said infinity-corrected objective lens and said movable condenser when said infinity-corrected objective lens is moved among differing positions.

51. An optical microscope system according to claim 40, wherein the optical microscope system is configured so that said infinity-corrected objective lens is movable only in a circular sector having a central angle less than 180°.

52. An optical microscope system according to claim 40, wherein said imaging body is a conventional imaging body, and said infinity-corrected objective lens, said mirror system and said support form a movable objective lens assembly, said movable objective lens assembly being retrofitted to said conventional imaging body.

* * * * *